United States Patent
Duensbier et al.

(10) Patent No.: US 11,303,045 B2
(45) Date of Patent: Apr. 12, 2022

(54) METHOD FOR PRODUCING A CURRENT CONDUCTING UNIT, JUNCTION BOX FOR A VEHICLE BATTERY, AND MOTOR VEHICLE

(71) Applicant: AUDI AG, Ingolstadt (DE)

(72) Inventors: Stefan Duensbier, Regensburg (DE); Stefan Hackner, Greding (DE)

(73) Assignee: AUDI AG, Ingolstadt (DE)

( * ) Notice: Subject to any disclaimer, the term of this patent is extended or adjusted under 35 U.S.C. 154(b) by 232 days.

(21) Appl. No.: 16/682,444

(22) Filed: Nov. 13, 2019

(65) Prior Publication Data
US 2020/0153123 A1 May 14, 2020

(30) Foreign Application Priority Data
Nov. 14, 2018 (DE) .......................... 102018219466.1

(51) Int. Cl.
*H01R 3/00* (2006.01)
*B60M 1/30* (2006.01)
(Continued)

(52) U.S. Cl.
CPC ............... *H01R 3/00* (2013.01); *B60M 1/307* (2013.01); *B60R 16/033* (2013.01); *H01B 17/18* (2013.01);
(Continued)

(58) Field of Classification Search
CPC .... H01R 25/16; H01R 25/161; H01R 25/162; H01R 13/68; H01R 29/00; H01R 43/0221;
(Continued)

(56) References Cited

U.S. PATENT DOCUMENTS 6,270,361 B1 * 8/2001 Onizuka ................ H01R 9/226
439/76.2
6,635,824 B1 * 10/2003 Oka ........................ H01R 9/226
174/72 B
(Continued)

FOREIGN PATENT DOCUMENTS

DE 10154234 A1 5/2003
DE 60125294 T2 7/2007
(Continued)

OTHER PUBLICATIONS

German Examination Report dated Jul. 1, 2019 in corresponding German Application No. 10 2018 219 466.1; 24 pages; Machine translation attached.
(Continued)

*Primary Examiner* — Oscar C Jimenez
*Assistant Examiner* — Paul D Baillargeon
(74) *Attorney, Agent, or Firm* — Maier & Maier, PLLC

(57) ABSTRACT

A method for producing a current conducting device, a junction box for a vehicle battery, and a motor vehicle having a corresponding junction box. In the method, multiple busbars are positioned in a predetermined location in relation to one another and then enclosed using an electrically insulating plastic cladding. In this case, a respective opening of the plastic cladding is left open in a respective connection region, in each of which at least two of the busbars meet one another. The busbars are then welded to one another in a respective region of the opening.

14 Claims, 2 Drawing Sheets

(51) Int. Cl.
*H01B 17/18* (2006.01)
*H02G 3/08* (2006.01)
*B60R 16/033* (2006.01)
*H01R 43/02* (2006.01)
*H01R 4/02* (2006.01)
*H01R 13/46* (2006.01)

(52) U.S. Cl.
CPC .............. *H01R 4/027* (2013.01); *H01R 13/46* (2013.01); *H01R 43/0221* (2013.01); *H01R 43/0263* (2013.01); *H02G 3/081* (2013.01)

(58) Field of Classification Search
CPC ............... H01R 43/0228; H01R 13/46; H01R 43/0263; H01R 4/027; H01R 13/696; H01R 13/50; H02G 3/081; H01B 17/18; H01B 17/16; H01B 17/24; B60M 1/307
See application file for complete search history.

(56) References Cited

U.S. PATENT DOCUMENTS

| | | | | |
|---|---|---|---|---|
| 7,002,813 | B2* | 2/2006 | Bergmann | H01L 31/02013 29/739 |
| 10,158,204 | B2* | 12/2018 | Okazaki | B60L 3/0046 |
| 2008/0042795 | A1* | 2/2008 | Fussl | H01H 85/044 337/191 |
| 2013/0068495 | A1* | 3/2013 | Hadi | H01R 25/14 174/68.2 |
| 2018/0049310 | A1 | 2/2018 | Schneider et al. | |
| 2018/0097322 | A1 | 4/2018 | Harris, III | |
| 2018/0212381 | A1* | 7/2018 | Kobayashi | H02G 5/007 |
| 2019/0044120 | A1* | 2/2019 | Ota | H01R 25/162 |
| 2020/0313139 | A1* | 10/2020 | Patterson | H01M 50/543 |

FOREIGN PATENT DOCUMENTS

| | | |
|---|---|---|
| DE | 102007003652 A1 | 7/2008 |
| DE | 102015200999 A1 | 7/2015 |
| DE | 102014216762 A1 | 2/2016 |
| DE | 102015014342 A1 | 7/2016 |
| DE | 102016124963 A1 | 6/2018 |
| JP | H05-121139 A | 5/1993 |

OTHER PUBLICATIONS

Office Action dated Jan. 6, 2022, in connection with corresponding Chinese Application No. 201911110106.6 (15 pp., including machine-generated English translation).

* cited by examiner

METHOD FOR PRODUCING A CURRENT CONDUCTING UNIT, JUNCTION BOX FOR A VEHICLE BATTERY, AND MOTOR VEHICLE

FIELD

The disclosure relates to a method for producing a current conducting unit, a junction box for a vehicle battery, which comprises such a current conducting unit, and a motor vehicle having such a junction box and/or having a corresponding vehicle battery, which comprises such a junction box. The junction box in the meaning of the invention is also technically referred to as a Battery Junction Box (BJB).

BACKGROUND

Busbars, also referred to as busbar rails, are used for conducting relatively large currents, which cannot readily be conducted via conventional cables. Such busbars are used in various technical areas and fields of application. Among them there are applications in which complexly shaped busbars have to be used, which heretofore have had to be preassembled manually in a complex manner. For this purpose, heretofore multiple parts of the respective busbar or multiple busbars have firstly been screwed together with one another and then, for example, with further parts or components, for example, a housing. Because of the high currents naturally resulting during use of busbars in the operation of a respective device, relatively large spacings have to be maintained to maintain predetermined air and creepage distances, i.e., corresponding installation spacings. A corresponding insulation coordinate specification can often only be reliably maintained in this case with substantial manufacturing and checking effort. Further disadvantages of previous manufacturing and installation processes are that due to the exposed busbars, high cleanliness classes are necessary and can make maintaining dimensional accuracy or corresponding tolerances of the busbars and the arrangement thereof difficult. Moreover, it is disadvantageous that, for example, burrs have to be cumbersomely removed along the busbars and/or can cause additional difficulties, since they can damage, for example, insulation or surrounding parts. Deburring is particularly cumbersome in this case due to often existing complex shaping or design of the busbars.

A current transportation device, in particular an electrical busbar, for a motor vehicle is known from DE 10 2016 124 963 A1. In this case, an elongated electromechanical base conductor is provided, which comprises an electrical rigid-mechanical plug connection device connected thereto in an electrical and rigidly-mechanical manner. This plug connection device can in turn be electrically contacted by an electrical rigid-mechanical counter plug connection device.

DE 10 2015 014 342 A1 describes a contacting element for a current collector plate. A solid metallic part is provided in this case, which is partially provided with a high-temperature-proof cladding, wherein the regions provided with a high-temperature-proof cladding are extrusion coated using a thermoplastic.

SUMMARY

The object of the present invention is to enable an automated, simplified, and particularly space-saving installation of a current conducting device. This object is achieved according to the invention by the subjects of the independent patent claims. Advantageous embodiments and refinements of the present invention are specified in the dependent patent claims, in the description, and in the figures.

A method according to the invention is used for producing a current conducting device. In the method, multiple busbars are positioned in a predetermined location in relation to one another. The busbars positioned in this manner are then enclosed using an electrically insulating plastic cladding, wherein an opening is left open in the plastic cladding in a respective connection region, in each of which at least two of the busbars meet one another. The respective connection region is thus accessible from outside the current conducting device through this opening. In a further method step of the method according to the invention, the busbars are welded to one another in a respective region of the opening or openings. The current conducting device produced in this manner thus comprises at least the multiple busbars welded to one another and the insulating plastic cladding.

To position the multiple busbars in the predetermined location or location relation to one another, the busbars can be arranged, for example, in a holding device or inserted therein. This holding device can advantageously be reused multiple times in this case, whereby particularly low piece costs for the current conducting device result. Since an initially liquid or liquefied and subsequently cured or set plastic can be used for the plastic cladding, a complex arrangement of multiple busbars can also be enclosed using the plastic cladding without particular effort. Since the liquefied plastic can flow into intermediate spaces in this case, in contrast to a conventionally provided screw connection, a defined sequence of the arrangement or connection of the busbars advantageously does not have to be maintained and a correspondingly large lateral spacing for a tool used for the conventional screw connection also does not have to be provided.

The present production method thus advantageously offers a high degree of flexibility and freedom with respect to possible designs and arrangements of the multiple busbars and/or the final current conducting device.

The multiple busbars are fixed in the relative location thereof in relation to one another by the plastic cladding. Easy welding of the multiple busbars to one another is first enabled in this way, since the cured plastic cladding prevents warping of the busbars or a busbar arrangement formed from the multiple busbars. Moreover, the plastic cladding having the multiple busbars embedded therein can be easily handled, for example, by a welding robot after the curing of the plastic, without a relative location change of the busbars occurring at the same time. The present production method thus advantageously enables a particularly high degree of automation and a particularly high positioning and repetition accuracy at the same time.

To keep the opening or openings open, the holding device can comprise, for example, corresponding projections or inwardly oriented bulges, wherein the busbars can then be arranged thereon. Since the busbars are then mechanically contacted by the holding device in corresponding mechanical contact regions, i.e., in the respective connection region, plastic cannot reach therein. Corresponding spacer elements can also be positioned on the busbars, for example, before they are enclosed using the plastic cladding. The spacer elements can then be removed after the curing of the plastic to obtain the openings.

Due to the electrically insulating property of the plastic cladding, previously required spacings, i.e., air and creepage distances, of the busbars in relation to surrounding parts can be reduced, whereby a reduced installation space requirement for the current conducting device results overall in spite of the additional plastic cladding. Assemblies which contain a current conducting device produced according to the invention can thus be produced more compactly than previously possible. Smaller spacings can also advantageously be provided between various, for example, bent sections of the busbars or one of the busbars in relation to another because of the electrically insulating plastic cladding, since the busbars are not exposed as presently typical, but rather protected by the plastic cladding, for example, from flashovers. Smaller bending radii or generally more compact arrangements of the busbars can thus be implemented, for example, with equal electrical or flashover safety.

A particularly high accuracy of fit can be achieved because the busbars are only welded to one another after the fixing thereof by the plastic cladding. Moreover, the busbar device produced according to the invention can be installed more easily than conventional busbar arrangements and is more robust with respect to mechanical influences than previous busbars. In particular, the plastic cladding can have a greater elasticity than a material, in particular a metallic material, used for the busbars, and can thus offer, for example, an improved shock absorption capability. A mechanical strain occurring during an installation process or during a later operation of the current conducting device can also advantageously be absorbed by the plastic cladding and/or only result in damage to the plastic cladding and not in a change of current conducting properties, for example, an electrical resistance, of the current conducting device and/or the busbars. Functioning as intended and specified can thus advantageously be ensured particularly reliably and permanently in the current conducting device.

A further advantage of the present invention is that possible burrs of the busbars also are or can be enclosed by the plastic cladding. Damage to surrounding parts can thus also be avoided without complex deburring of the busbars. A heretofore possibly provided deburring of the busbars can advantageously be omitted in the production method according to the invention. This can furthermore contribute to an efficiency improvement and cost reduction for the production method according to the invention.

In one advantageous design of the present invention, the busbars are extrusion coated using the plastic cladding. The extrusion coating of the busbars using the plastic is a particularly advantageous method, since in this case the plastic, in spite of possibly complex shaping of the arrangement made of the multiple busbars and/or possibly complex shaping of one or more of the busbars, can clad or enclose them particularly reliably, since it can also penetrate into relatively small or concealed intermediate spaces due to its flow properties. Moreover, complex pre-molding of the plastic cladding can advantageously be omitted.

Alternatively, it can also be possible to embed the multiple busbars in plastic, for example, or to enclose them with the plastic cladding in one or more immersion baths. Flexible adaptation options advantageously suggest themselves depending on the application here, so that the production method according to the invention is advantageously optimized for greatly varying applications.

In a further advantageous embodiment of the present invention, a thermally conductive plastic is used as or for the plastic cladding. This plastic can in particular have a thermal conductivity of at least 1 W/(m·K) in this case. Depending on the application or intended use or thermal strain to be expected, a thermally conductive plastic having a higher thermal conductivity can be used. Heat which arises in the busbars during conduction of current through them can advantageously be dissipated from the busbars and emitted to the surroundings by the thermal conductivity of the plastic, i.e., the plastic cladding. The plastic cladding can thus in other words be used as a heat sink or cooling element for cooling or dissipating heat of the busbars. Due to the use of the thermally conductive plastic, a separate heat sink can thus possibly be saved, whereby an additional space and cost savings can result. Since the plastic of the plastic cladding directly touches the busbars, a particularly efficient heat transfer, i.e., a particularly efficient heat dissipation is possible. Because the plastic cladding is electrically insulating, the option moreover suggests itself of extending one or more cooling channels through the plastic cladding, through which a coolant or cooling medium can then be guided to enable even more effective heat dissipation of the current conducting device and/or the busbars. In particular, a typically particularly reasonably priced, i.e., cost-effective electrically conductive coolant or cooling medium, such as water, can be used in this case, which can often be problematic in the case of conventional busbar arrangements without electrical insulation because of the exposed nature of the busbars and the conducted currents and a short-circuit safety to be maintained.

In a further advantageous embodiment of the present invention, the busbars are connected to one another without screw connections. The busbars are thus particularly preferably exclusively held on one another by welding, i.e., respective welded bonds, and by the plastic cladding. In particular, no screws or screw connections are thus provided for connecting the busbars to one another or for connecting the plastic cladding to the busbars. In this way, multiple work steps can advantageously be saved and manufacturing of the busbars can be simplified. Specifically, the current conducting device can be produced while omitting or avoiding an introduction of screw holes into the busbars. Corresponding screws and also associated nuts, washers, and the like can thus be omitted. Not only manufacturing effort, but rather material and thus weight can advantageously be saved in this way.

In a further advantageous embodiment of the present invention, the busbars are welded to one another by means of laser welding, wherein a laser beam used for this purpose is guided or radiated through the respective opening. The use of laser welding is particularly advantageous in this case, since the laser beam occupies significantly less room or space than, for example, a conventional contact welding device, so that a size of the openings left open can advantageously be minimized. An improved electrical insulation or insulating effect of the plastic cladding thus results. Because of the minimal space requirement of the laser beam and the option of deflecting the laser beam as necessary, particularly complex shaping of the current conducting device can advantageously be implemented, while in contrast other welding methods would possibly require larger free spaces for access, i.e., reaching the respective connection region. For corresponding reasons, the use of laser welding moreover advantageously enables greater thicknesses or material thicknesses of the plastic cladding to be provided at equal diameter of the respective opening.

In a further advantageous embodiment of the present invention, a shunt, which is then also enclosed using the plastic cladding, is arranged between two of the busbars during the positioning of the busbars. In this case, a contacting opening for contacting the shunt is left open for tapping a measurement signal from the shunt. Alternatively, an electrical contact element protruding or projecting from the shunt is only partially enclosed using the plastic cladding, so that the contact element protrudes through the plastic cladding after the production of the current conducting device, i.e., in particular after the curing of the plastic cladding. The measurement signal can then be tapped via this contact element. The shunt can be electrically connected to the busbars before being enclosed by the plastic cladding, for example, screwed or welded on. This can also take place after the enclosure with the plastic cladding, however, for which purpose the contacting opening or an additional opening can then also be left open in accordance with the openings provided for connecting the busbars to one another. The two last-mentioned options have different advantages. The first option can thus offer the advantage that a functionality of the shunt can be checked before the enclosure using the plastic cladding, so that a replacement is optionally possible with particularly little effort if needed. The second option, in which the shunt is only fixedly connected to the busbars after the enclosure by the plastic cladding, can offer the advantage in relation thereto that because of the fixing of the busbars and the shunt in relation to one another effectuated by the plastic cladding, no warping occurs during welding of the shunt to the busbars, whereby a particularly high level of accuracy of fit and dimensional accuracy can be achieved.

In a further advantageous embodiment of the present invention, a fuse is welded onto at least one of the busbars. This can be performed before the enclosure of the busbars using the plastic cladding or thereafter. A corresponding opening can then be left open for the latter.

An integration of the fuse provided here and of the mentioned shunt into the current conducting device can advantageously further reduce an installation effort, since fewer individual parts or components have to be handled during an arrangement or introduction of the current conducting device in a larger assembly or device. Moreover, parts embedded or integrated into the plastic cladding, thus such as the shunt and/or the fuse here, for example, are protected particularly advantageously from damage both during the installation process and also thereafter. Moreover, the plastic cladding can also protect surrounding parts from damaging influences if the fuse is triggered or blows.

In a further advantageous embodiment of the present invention, after the welding of the busbars to one another, the respective opening is filled using an electrically insulating material. The material used for the plastic cladding can in particular also be used for this purpose. In other words, the connection regions and corresponding welded bonds or spot welds are thus concealed or covered by the electrically insulating material. A continuous electrically insulating cladding of the busbars thus advantageously results and therefore an improved electrical insulation and an improved flashover safety. Spacings of the current conducting device and/or the busbars to be maintained in relation to surrounding components for electrical safety can thus be reduced further. A particularly close, possibly continuous connection between the material introduced to fill up the opening or openings and the plastic cladding which is then already provided can possibly be achieved by the use of the same material for filling up the openings and for the plastic cladding. In this way, not only can the electrical safety be further improved, but rather the busbars can advantageously also be protected particularly effectively from ambient moisture, for example.

A further aspect of the present invention is a junction box for a vehicle battery, which comprises a current conducting device produced according to the method according to the invention. As explained at the outset, the junction box is also technically referred to as a Battery Junction Box (BJB). The junction box can contain, for example, one or more electrical terminals for connecting or attaching, for example, one or more battery cells or battery modules of the vehicle battery, one or more electrical distributors, one or more contactors, and/or the like. The multiple busbars can be used or provided, for example, for connecting a contactor to a fuse, the fuse to a shunt, the shunt to a plug, and/or more of the like, can thus be designed and arranged for this purpose.

The current conducting device can thus accordingly comprise one or more contacts or terminal points, at which at least one of the busbars can be electrically contacted from outside the current conducting device, at which the respective busbar is thus not completely covered or clad by the plastic cladding.

A use of the current conducting device according to the invention in the BJB of a vehicle battery is particularly advantageous, since particularly many and branching, i.e., complexly shaped and arranged busbars are often used here according to the present prior art. The advantages of the present invention can thus come to bear particularly effectively here.

A further aspect of the present invention is a motor vehicle which comprises at least one junction box according to the invention. The motor vehicle according to the invention can thus in particular comprise a vehicle battery having a junction box according to the invention.

The invention also includes refinements of the junction box according to the invention and the motor vehicle according to the invention, which comprise features as are described in conjunction with the refinements of the method according to the invention and the current conducting device produced according to the method according to the invention and vice versa. To avoid unnecessary redundancy, the corresponding refinements of the present invention are not each separately described here once again for all of these aspects of the invention.

BRIEF DESCRIPTION OF THE DRAWINGS

The invention also comprises the combinations of the features of the described embodiments.

Exemplary embodiments of the invention are described hereafter. In the figures.

DETAILED DESCRIPTION

The exemplary embodiments explained hereafter are preferred embodiments of the invention. In the exemplary embodiments, the described components of the embodiments each represent individual features of the invention to be considered independently of one another, which each also refine the invention independently of one another. The disclosure is therefore also to comprise combinations of the features of the embodiments other than those shown. Furthermore, the described embodiments can also be supplemented by further ones of the already described features of the invention.

In the figures, identical reference signs each identify functionally-identical elements.

Figure 1:
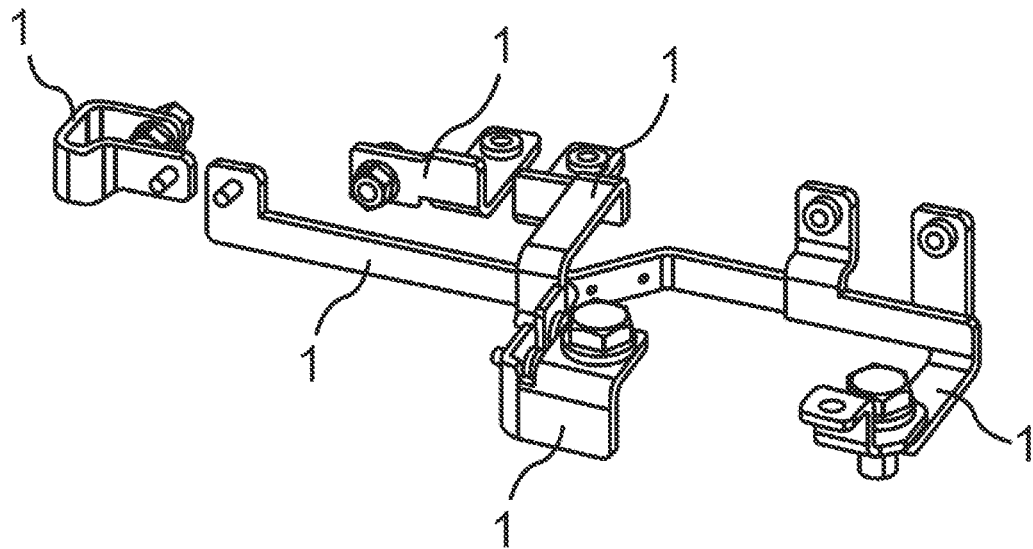
FIG. 1 shows a schematic perspective view of conventional busbars having a screw connection.

FIG. 1 shows a schematic perspective view of conventional busbars 1, which are screwed together with one another manually in the scope of a preassembly. It is immediately apparent here that a substantial manufacturing and material expenditure is linked thereto. Moreover, inaccuracies or inconsistencies can occur in a relative alignment of the individual busbars 1 in relation to one another. In the exposed shape and arrangement of the busbars 1 illustrated in FIG. 1, moreover relatively large spacings of the surrounding parts have to be maintained. To remedy these problems and disadvantages, an improved production method can be used, which is to be explained hereafter.

Figure 2:
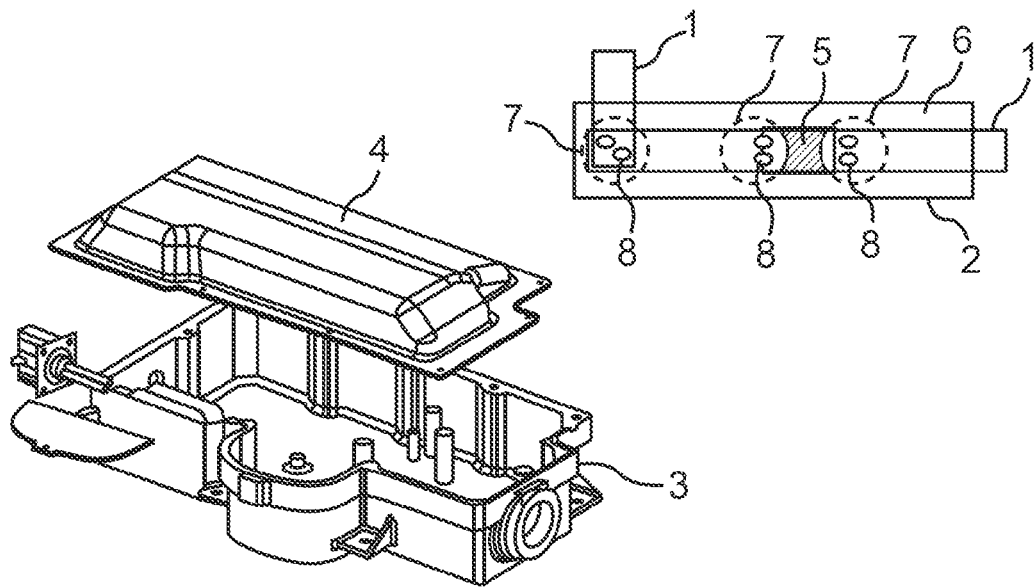
FIG. 2 shows a schematic overview illustration for visualizing an improved production and installation of a current conducting device.
Figure 3:
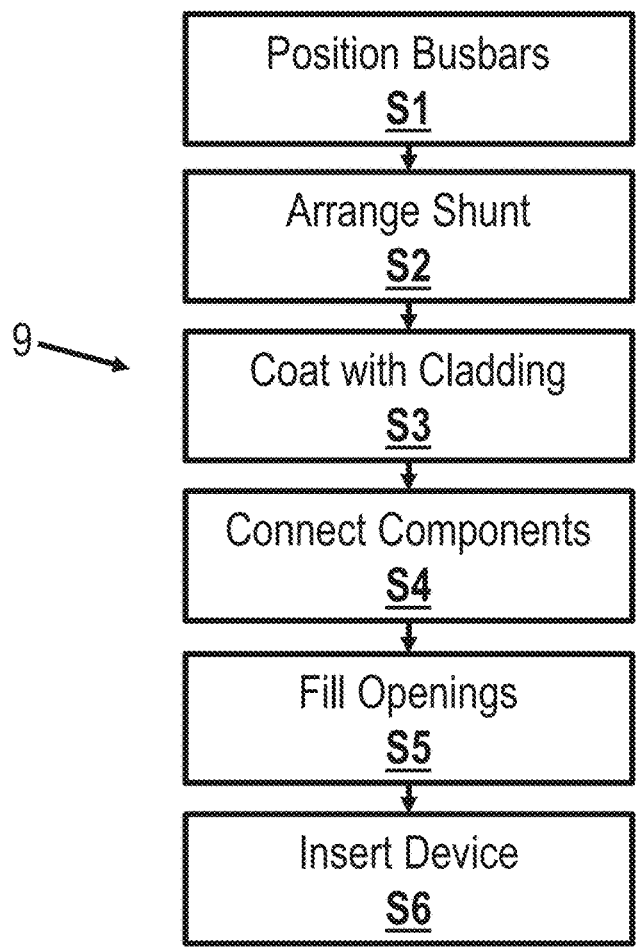
FIG. 3 shows a schematic exemplary flow chart of a method for producing a current conducting device.

FIG. 2 shows for this purpose a schematic overview illustration having a schematic side view of an improved current conducting device 2 and a schematic, perspective exploded view of a detail of a junction box 3 having a cover 4. In this case the current conducting device 2—not shown to scale—is provided for an arrangement in the junction box 3. FIG. 3 shows for this purpose a schematic flow chart 9 for a method for producing the current conducting device 2 by way of example.

In a method step S1 of this method, firstly the individual busbars 1 are positioned in a predetermined location in relation to one another, for example, in a receptacle or holding device (not shown here).

In a method step S2, in the present example a shunt 5 is arranged between two of the busbars 1 and optionally already connected at this point in time to the corresponding busbars 1, for example, screwed or welded on. Further components, for example, one or more fuses or the like, can also be arranged here on the busbars 1 or connected to the busbars 1.

In a method step S3, the arrangement of the busbars 1 positioned in relation to one another and the shunt 5 and possibly the further components is extrusion coated using an electrically insulating plastic cladding 6. In this case, openings 7 are left open at respective connection points, i.e., in respective connection regions, in each of which two of the busbars 1 or one of the busbars 1 and a further component, for example, one of the busbars 1 and the shunt 5 here, meet one another or are arranged overlapping one another. These openings 7 thus represent recesses, holes, or passages in the plastic cladding 6, which enable an entry or access to the connection points or connection regions from outside the plastic cladding 6.

After the plastic cladding 6 is cured, the busbars 1 and the components are fixed in the predetermined relative location thereof in relation to one another. In a method step S4, the busbars 1 and—if not yet performed in method step S2—the components are connected to one another and/or to the busbars 1 in the connection regions. A laser beam of a laser welding device is guided or oriented for this purpose through the respective opening 7 to place respective spot welds 8 in the present case.

In a method step S5, the openings 7 previously left open are filled, i.e., filled up using an electrically insulating material, to also implement a continuous electrical insulation of the busbars 1 in relation to surroundings of the current conducting device 2 produced in this manner in the connection regions.

It is recognizable here that one of the busbars 1 can protrude out of the plastic cladding 6 at each of the ends of the current conducting device 2. Corresponding protruding regions of the busbars 1 can be used as electrical contacts, terminals, or terminal regions, via which the current conducting device 2 can be electrically connected to further electrical components. Such further components can be, for example, battery modules of a vehicle battery, contactors in the junction box 3, and/or one or more of the like. For this purpose, in a method step S6, in the present case the current conducting device is inserted manually or automatically by means of a robot into the junction box 3. This is possible particularly simply and reliably and with high repetition accuracy and accuracy of fit in this case, since due to the plastic cladding 6 and the welded bonds, all components of the current conducting device 2 are fixed permanently in relation to one another in location and thus the current conducting device 2 forms an immovable monolithic assembly as such.

Figure 4:
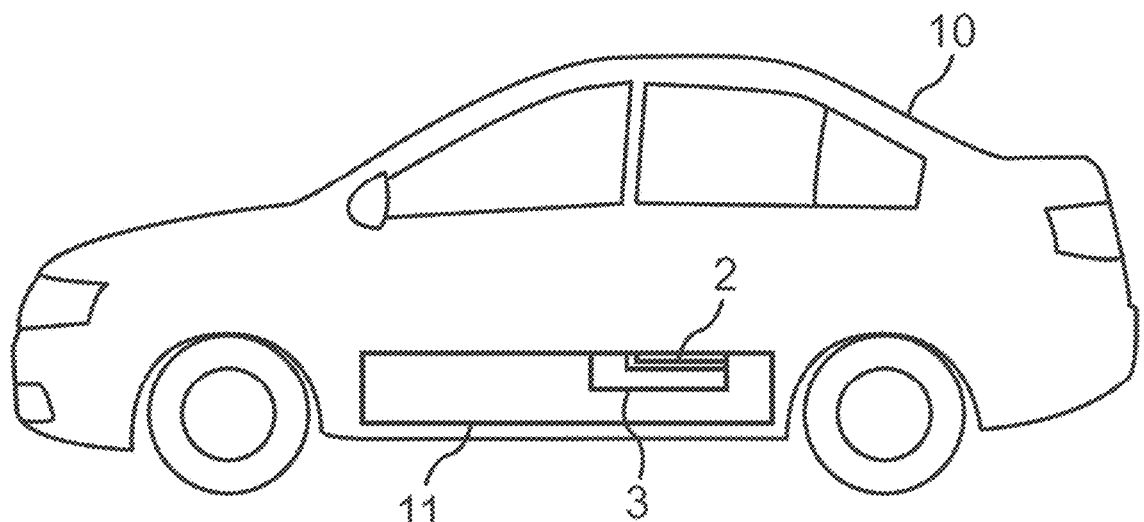
FIG. 4 shows a schematic side view of a vehicle having a battery which comprises a current conducting device.

FIG. 4 shows a schematic side view of an electric vehicle 10 having a traction battery 11, for which the junction box 3 is provided. After the junction box 3 is completely equipped and closed by means of the cover 4, in a further at least partially automated or at least partially automatable assembly step, the junction box 3 can be inserted into the traction battery 11, i.e., into its battery housing, and the traction battery 11 can be arranged in the electric vehicle 10.

Overall, the described examples show how an automated, simplified, and space-saving production and installation of a busbar arrangement can be enabled by the present invention.

The invention claimed is:

1. A method for producing a current conducting device, comprising:
    positioning multiple busbars in a predetermined position in relation to one another,
    enclosing the positioned busbars using an electrically insulating plastic cladding, wherein an opening of the plastic cladding is left open in a respective connection region, in each of which at least two of the busbars meet one another, and
    welding the busbars to one another in a respective region of the opening,
    wherein the busbars are extrusion coated using the plastic cladding.

2. The method according to claim 1, wherein a thermally conductive plastic is used for the plastic cladding.

3. The method according to claim 2, wherein the busbars are connected to one another without screw connections.

4. The method according to claim 2, wherein the busbars are welded to one another by means of laser welding whereby a laser beam is radiated through the respective opening.

5. The method according to claim 2, wherein during positioning of the busbars, a shunt is arranged between two of the busbars, which is then also enclosed using the plastic cladding,
    wherein, for tapping a measurement signal from the shunt, a contacting opening for contacting the shunt is left open or an electrical contact element protruding from the shunt is only partially enclosed using the plastic cladding, so that the electrical contact element projects through the cladding after the production of the current conducting device.

6. The method according to claim 2, wherein a fuse is welded onto at least one of the busbars.

7. The method according to claim 1, wherein the busbars are connected to one another without screw connections.

8. The method according to claim 7, wherein during positioning of the busbars, a shunt is arranged between two of the busbars, which is then also enclosed using the plastic cladding, wherein, for tapping a measurement signal from the shunt, a contacting opening for contacting the shunt is left open or an electrical contact element protruding from the shunt is only partially enclosed using the plastic cladding, so that the electrical contact element projects through the cladding after the production of the current conducting device.

9. The method according to claim 7, wherein a fuse is welded onto at least one of the busbars.

10. The method according to claim 1, wherein the busbars are welded to one another by means of laser welding whereby a laser beam is radiated through the respective opening.

11. The method according to claim 10, wherein during positioning of the busbars, a shunt is arranged between two of the busbars, which is then also enclosed using the plastic cladding, wherein, for tapping a measurement signal from the shunt, a contacting opening for contacting the shunt is left open or an electrical contact element protruding from the shunt is only partially enclosed using the plastic cladding, so that the electrical contact element projects through the cladding after the production of the current conducting device.

12. The method according to claim 1, wherein, after welding the busbars to one another, the respective opening is filled up using an electrically insulating material.

13. A method for producing a current conducting device, comprising:

positioning multiple busbars in a predetermined position in relation to one another, enclosing the positioned busbars using an electrically insulating plastic cladding, wherein an opening of the plastic cladding is left open in a respective connection region, in each of which at least two of the busbars meet one another, and welding the busbars to one another in a respective region of the opening, wherein during positioning of the busbars, a shunt is arranged between two of the busbars, which is then also enclosed using the plastic cladding, wherein, for tapping a measurement signal from the shunt, a contacting opening for contacting the shunt is left open or an electrical contact element protruding from the shunt is only partially enclosed using the plastic cladding, so that the electrical contact element projects through the cladding after the production of the current conducting device.

14. A method for producing a current conducting device, comprising:

positioning multiple busbars in a predetermined position in relation to one another, enclosing the positioned busbars using an electrically insulating plastic cladding, wherein an opening of the plastic cladding is left open in a respective connection region, in each of which at least two of the busbars meet one another, and welding the busbars to one another in a respective region of the opening, wherein a fuse is welded onto at least one of the busbars.

* * * * *